United States Patent
Grosspietsch et al.

(10) Patent No.: US 7,114,605 B2
(45) Date of Patent: Oct. 3, 2006

(54) DOUBLE OR MULTIPLE DISK COUPLING DEVICE AND DISK ARRANGEMENT THEREFOR

(75) Inventors: Wolfgang Grosspietsch, Schweinfurt (DE); Wolfgang Kundermann, Schweinfurt (DE); Volker Stampf, Schweinfurt (DE); Angelika Ebert, Schweinfurt (DE); Wolfgang Reisser, Sennfeld (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/450,028

(22) PCT Filed: Nov. 8, 2001

(86) PCT No.: PCT/EP01/12886

§ 371 (c)(1),
(2), (4) Date: Jun. 9, 2003

(87) PCT Pub. No.: WO02/46632

PCT Pub. Date: Jun. 13, 2002

(65) Prior Publication Data

US 2004/0035666 A1    Feb. 26, 2004

(30) Foreign Application Priority Data

Dec. 7, 2000   (DE) .............................. 100 60 883
Mar. 8, 2001   (DE) .............................. 101 11 203

(51) Int. Cl.
*F16D 21/06*   (2006.01)

(52) U.S. Cl. ................ 192/48.8; 192/70.2; 192/113.36

(58) Field of Classification Search ............ 192/70.2, 192/87.11, 107 R, 107 M, 113.36; 29/412, 29/417, 469.5
See application file for complete search history.

(56) References Cited

U.S. PATENT DOCUMENTS

| 4,260,047 A | 4/1981 | Nels |
| 4,640,294 A * | 2/1987 | Ordo .................. 192/70.2 |
| 4,736,828 A | 4/1988 | Diessner |
| 5,176,236 A | 1/1993 | Ghidorzi et al. |

(Continued)

FOREIGN PATENT DOCUMENTS

DE      37 12 898 A1    11/1988

(Continued)

*Primary Examiner*—Saul Rodriguez
(74) *Attorney, Agent, or Firm*—Cohen, Pontani, Lieberman & Pavane

(57) ABSTRACT

A multiple disk clutch device for arrangement in a drivetrain of a motor vehicle between a drive unit and a transmission, includes at least an inner and an outer disk clutch arrangement that are radially staggered and associated with a transmission input shaft of the transmission. Each of the plural clutch disk arrangements includes a set of disks, the set of disks have an outer disk associated with an outer disk carrier and an inner disk associated with an inner disk carrier. The outer disks are operable to mutually engage the inner disks in a driving arrangement. Each of the plural disk sets includes at least one disk having a lining and at least one disk being unlined where one of the inner and outer disks of the inner and the outer disk clutch arrangements of the plural disk clutch arrangements is the lined disk.

18 Claims, 10 Drawing Sheets

U.S. PATENT DOCUMENTS

| | | |
|---|---|---|
| 5,361,480 A | 11/1994 | Gardner et al. |
| 5,571,372 A | 11/1996 | Miyaishi et al. |
| 5,887,690 A * | 3/1999 | Haupt .................... 192/87.11 |
| 5,897,737 A | 4/1999 | Quigley |
| 5,934,435 A | 8/1999 | Bauer |
| 6,370,755 B1 * | 4/2002 | Wakamori .................... 29/412 |
| 6,378,675 B1 | 4/2002 | Kundermann et al. |
| 6,401,894 B1 * | 6/2002 | Merkel et al. ............. 192/48.9 |
| 6,419,065 B1 * | 7/2002 | Mieda ....................... 192/70.2 |
| 6,454,074 B1 | 9/2002 | Kundermann et al. |
| 6,464,059 B1 | 10/2002 | Kundermann et al. |
| 6,471,026 B1 | 10/2002 | Kundermann et al. |
| 6,491,149 B1 | 12/2002 | Kundermann et al. |
| 6,499,578 B1 | 12/2002 | Kundermann et al. |
| 6,523,657 B1 | 2/2003 | Kundermann et al. |
| 6,835,448 B1 | 12/2004 | Menard et al. |
| 2002/0084167 A1 | 7/2002 | Wakamori |

FOREIGN PATENT DOCUMENTS

| | | |
|---|---|---|
| DE | 100 04 179.5 A1 | 4/2001 |
| DE | 100 04 186.8 A1 | 4/2001 |
| DE | 100 04 189.2 | 4/2001 |
| DE | 100 04 190.6 | 4/2001 |
| DE | 100 04 195 | 4/2001 |
| DE | 100 34 730.4 A1 | 8/2001 |
| EP | 0 758 434 B1 | 4/1995 |
| EP | 0 848 179 A1 | 6/1998 |

* cited by examiner

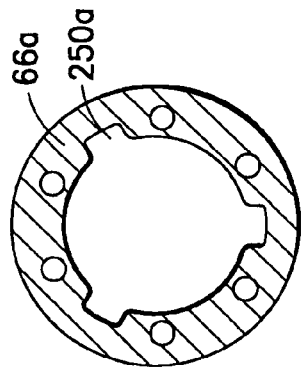
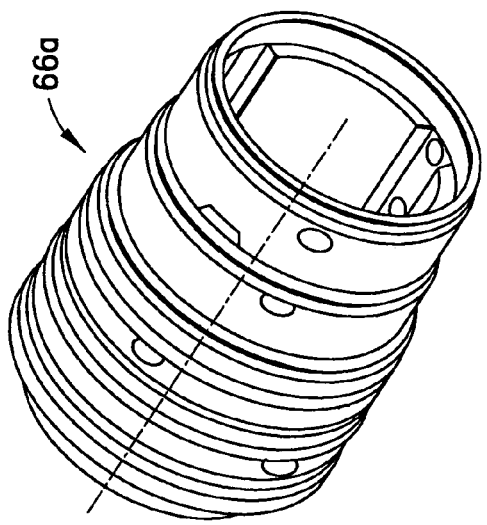
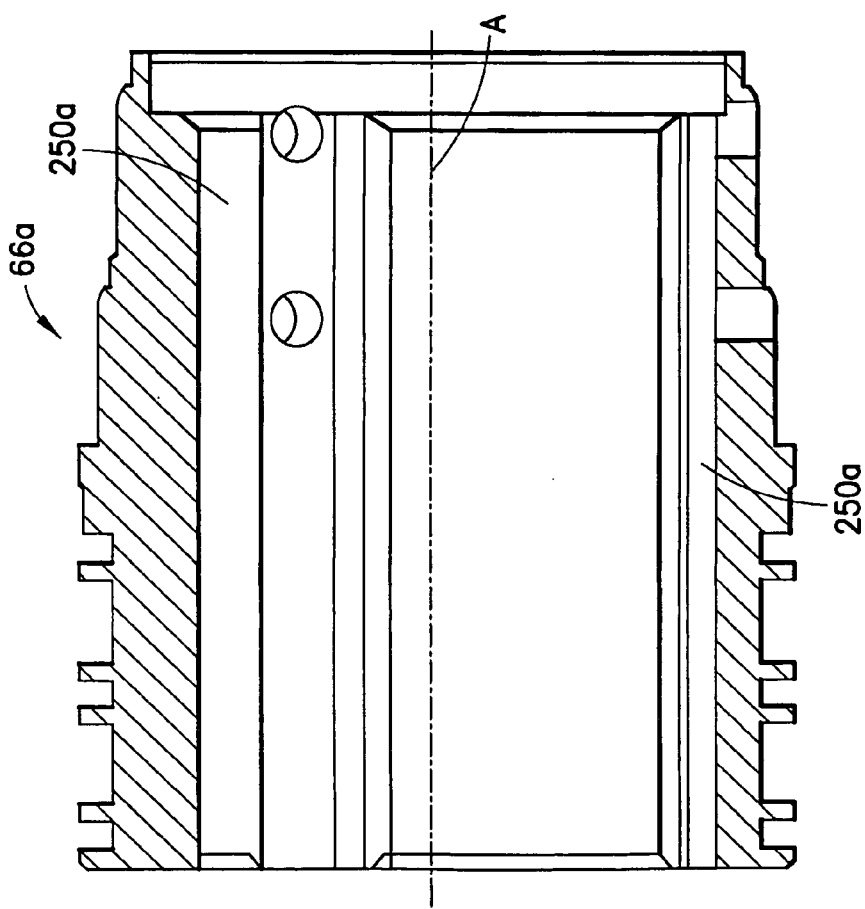

DOUBLE OR MULTIPLE DISK COUPLING DEVICE AND DISK ARRANGEMENT THEREFOR

PRIORITY CLAIM

This is the national phase application of PCT Application PCT/EP01/12886 filed on Nov. 8, 2001, which claims priority from Application DE 100 60 883.3 filed Dec. 7, 2000 in Germany and Application DE 101 11 203.3 filed Mar. 8, 2001 in Germany.

FIELD OF THE INVENTION

The invention relates to a dual clutch device or multiple disk clutch device for arrangement in a drivetrain of a motor vehicle between a drive unit and a transmission, wherein the clutch device has a plurality of radially staggered disk clutch arrangements.

BACKGROUND OF THE INVENTION

Dual clutch devices or multiple disk clutch devices are disclosed in the following U.S. patent documents: (a) U.S. Pat. No. 6,471,026 and U.S. Pat. No. 6,378,675; (b) U.S. Pat. No. 6,464,059; (c) U.S. Pat. No. 6,454,074 and U.S. Pat. No. 6,378,675; (d) U.S. Pat. No. 6,471,026; (e) U.S. Pat. No. 6,449,578; (f) U.S. Pat. No. 6,491,149; (g) U.S. Pat. No. 6,454,074, the disclosures of which are incorporated by reference in the disclosure of the present application. Further, in this connection reference is made to a clutch device disclosed in U.S. Pat. No. 5,887,690.

Disk clutch arrangements of the type mentioned above are generally wet clutch devices. As a rule, this type of wet clutch device has slotted lining disks and counter-disks without lining which are manufactured from steel, for example. Torque is introduced into the disk set, e.g., via the profile of an outer disk carrier in the outer disks, passes into the respective clutch arrangement to the inner disks and is conducted from there to the inner disk carrier, assuming a normal flow of force from the drive unit to the transmission. Alternatively, the clutch device can also be designed in such a way that the torque is conducted from inside to outside for this standard operating state.

In the designs of a wet dual clutch disclosed in the patent documents cited above, the lining disks of a radial outer clutch arrangement (outer clutch, for short) are associated with the outer disk carrier and the end disks of this "outer clutch" which define the disk set axially are formed by outer disks which are accordingly constructed with a lining on only one side. An advantage of this arrangement consists in that the lining disks with their slots are associated with the input side of the clutch device, that is, are driven directly by the drive unit, so that a conveying action is exerted on the cooling fluid, particularly cooling oil, when the transmission input shaft is stationary and the drive unit (engine) and, consequently, the outer disk carrier are rotating. This conveying action relies primarily on centrifugal force and reinforces the cooling of the clutch arrangement. On the other hand, a different allocation was chosen for the disks of the radial inner clutch arrangement (inner clutch, for short), wherein the outer disks associated with the input side are constructed without linings and the inner disks associated with the output side are constructed as lining-carrying disks.

It has been shown that while the ideas upon which the designs in these patent applications are based need not be revised, a high degree of stability is achieved in the clutch arrangement without such an allocation of the outer disks and inner disks for the radial outer clutch arrangement. That is, it has been shown that a sufficient cooling effect is achieved in the disk set even with out lined disks coupled on the drive side, so that there is no risk of "burning" the clutch arrangement at least for normal continuous and peak-load demands.

SUMMARY OF THE INVENTION

Against this background, it is found to be very advantageous when the lined disks of at least one radial inner disk clutch arrangement and the lined disks of at least one radial outer disk clutch arrangement are both constructed as outer disks or, preferably, inner disks. The disks having the lining can be constructed with lining-carrying elements and linings arranged on one side of the latter or, preferably, both sides of the latter.

Various advantages can result when the disks having linings and, correspondingly, the disks without linings are allocated in this way, respectively, to the outer disk carrier (as outer disks) and to the inner disk carrier (as inner disks) in an identical manner for the radial inner disk clutch arrangement and for the radial outer disk clutch arrangement. It is possible to economize on material during manufacture in that the outer disks and inner disks of the radial inner disk set are produced to some extent from the cuttings or waste of the outer disks and inner disks of the radial outer disk set, and vice versa, particularly when the disk set of the radial outer clutch arrangement has an inner diameter that is greater than an outer diameter of the disk set of the radial inner clutch arrangement and meets at least one of the following conditions:

at least one, preferably several, disks of the radial inner clutch arrangement which do not have linings and at least one, preferably several, disks of the radial outer clutch arrangement which do not have linings have the same axial thickness and are made from the same material;

at least one, preferably several, lining-carrying elements of the radial inner clutch arrangement and at least one, preferably several, lining-carrying elements of the radial outer clutch arrangement have the same axial thickness and are made from the same material;

at least one, preferably several, linings of the radial inner clutch arrangement and at least one, preferably several, linings of the radial outer clutch arrangement have the same axial thickness and are made from the same material.

All of the disks having linings are preferably constructed with a lining on both sides, so that the end disks which are provided in the clutch designs in the above-cited patents and which are constructed with a lining on one side are dispensed with. This results in cost advantages. Further, the clutch device can be constructed so as to be shorter axially. As a rule, the disks having linings are constructed with lining slots.

It is particularly preferable that the disks of at least one disk set, preferably all disk sets, which are associated with an input side of the clutch device and are coupled or can be coupled to a driven shaft of the drive unit have a greater inertia as a whole than the disks which are associated with an output side of the clutch device and which are coupled or can be coupled to the respective transmission input shaft. In this way, a smaller inertial mass which relieves the transmission synchronization is more effective on the transmission side than on the drive unit side. A comparatively large inertial mass on the input side is even desirable because, in case a dual-mass flywheel or torsional vibration damper is arranged between the drive unit and the clutch device, it acts as a secondary mass which advantageously reinforces their function. The outer disks of the respective disk set are preferably associated with the input side and the inner disks of the respective disk set are preferably associated with the output side.

According to another aspect, the invention provides a method for the production of a disk arrangement for a clutch device according to the invention, wherein the disk arrangement comprises:

at least one, preferably a plurality of, first disks without linings which are associated with a first, radial outer disk clutch arrangement and at least one, preferably a plurality of, second disks without lining which are associated with second, radial inner disk clutch arrangement, and/or at least one, preferably a plurality of, first lining-carrying elements which are associated with a first, radial outer disk clutch arrangement and at least one, preferably a plurality of, second lining-carrying elements which are associated with a/the second, radial inner disk clutch arrangement, and/or at least one, preferably a plurality of, first linings which are associated with a/the first, radial outer disk clutch arrangement and possibly arranged on the first lining-carrying element, and at least one, preferably a plurality of, second linings which are associated with a second, radial inner disk clutch, wherein the method comprises the step of providing material from which the disks or lining-carrying elements or linings are cut. According to the invention, it is suggested that the method comprises at least one of the following steps:

at least one first material piece portion provided for supplying a first disk and at least one second material piece portion provided for supplying a second disk are cut in a cutting process or several cutting processes from a common material piece, wherein the first material piece portion surrounds the second material piece portion in the material piece on the radial outside with respect to a reference point located inside the material piece portions;

at least one first material piece portion provided for supplying a first lining-carrying element and at least one second material piece portion provided for supplying a second lining-carrying element are cut in a cutting process or several cutting processes from a common material piece, wherein the first material piece portion surrounds the second material piece portion in the material piece on the radial outside with respect to a reference point located inside the material piece portions;

at least one first material piece portion provided for supplying a first lining and at least one second material piece portion provided for supplying a second lining are cut in one or more cutting processes from a common material piece, wherein the first material piece portion surrounds the second material piece portion in the material piece on the radial outside with respect to a reference point located inside the material piece portions.

According to another aspect, the invention provides a disk arrangement for a clutch device according to the invention. The disk arrangement according to the invention can be produced or, preferably, is produced according to the method according to the invention and comprises:

at least one, preferably a plurality of, first disks without linings which are associated with a first, radial outer disk clutch arrangement and at least one, preferably a plurality of, second disks without linings which are associated with a second, radial inner disk clutch arrangement, and/or at least one, preferably a plurality of, first lining-carrying elements which are associated with a first, radial outer disk clutch arrangement and at least one, preferably a plurality of, second lining-carrying elements which are associated with a/the second, radial inner disk clutch arrangement, and/or at least one, preferably a plurality of, first linings which are associated with a/the first, radial outer disk clutch arrangement and possibly are arranged on a respective first lining-carrying element, and at least one, preferably a plurality of, second disks linings which are associated with a/the second, radial inner disk clutch arrangement, and are possibly arranged on a respective second lining-carrying element.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIGS. 8a, b and c are views of a sleeve-like ring part, by means of which the clutch arrangements of the dual clutches according to FIGS. 1 to 3 are supported at the transmission input shafts;

DETAILED DESCRIPTION OF THE PRESENTLY PREFERRED EMBODIMENTS

Figure 1:
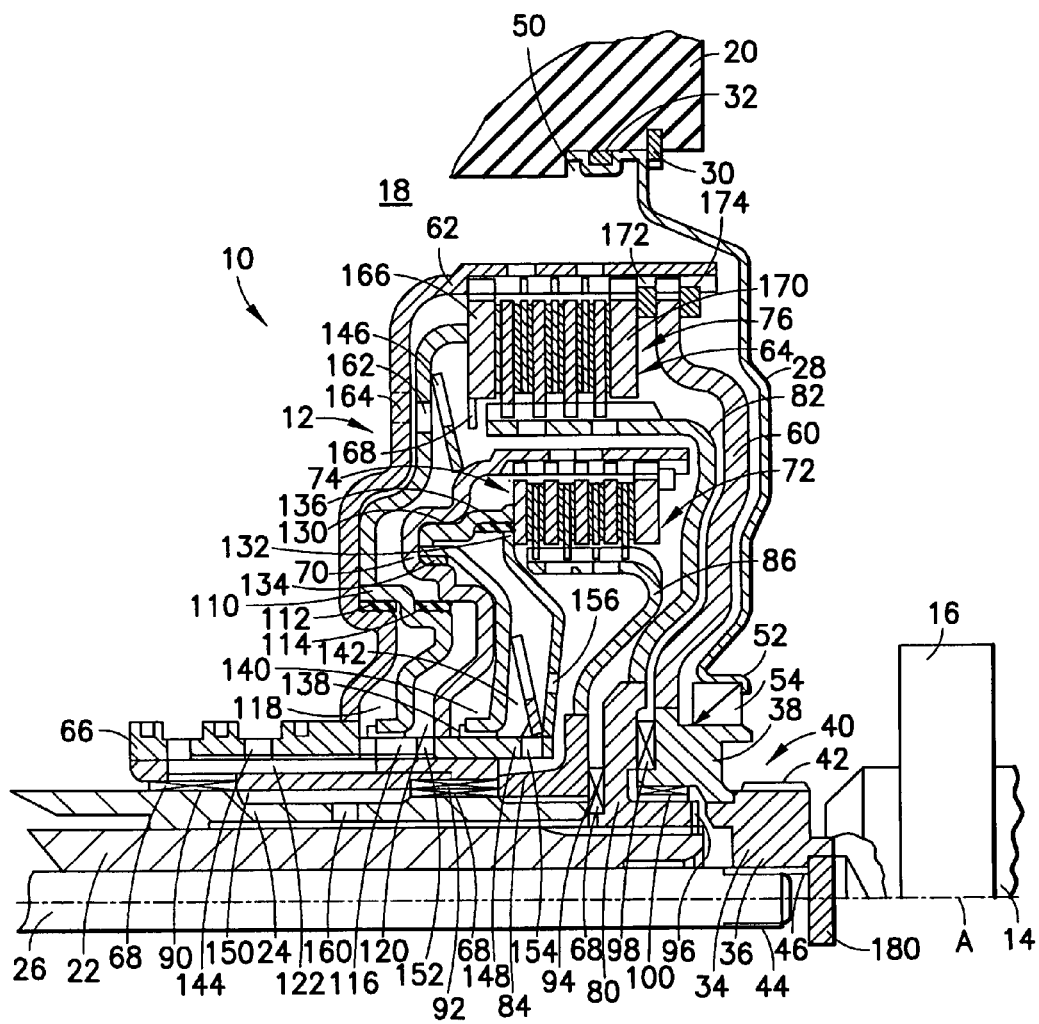
FIG. 1 is a partial cross-sectional view of a dual clutch according to the prior art.

FIG. 1 shows a dual clutch 12 which is arranged between a drive unit and a transmission. A drive unit, e.g., an internal combustion engine, is indicated in FIG. 1 only by a driven shaft 14, possibly a crankshaft 14, with a coupling end 16 for coupling to a torsional vibration damper, not shown. The transmission is illustrated in FIG. 1 by a transmission housing portion 20 defining a transmission bell housing 18 and two transmission input shafts 22 and 24, both of which are constructed as hollow shafts. Transmission input shaft 22 extends through the transmission input shaft 24 substantially coaxial to the latter. A pump drive shaft which serves to drive a transmission-side oil pump, not shown in FIG. 1, is arranged in the interior of the transmission input shaft 22. When at least one oil pump driven by an electric motor is provided, the pump drive shaft can be dispensed with.

The dual clutch 12 is received in the transmission housing casing 18, wherein the interior of the casing is closed in the direction of the drive unit by a cover 28 which is pressed into a casing housing opening and/or is secured therein by a snap ring 30. When the dual clutch has wet friction clutches, for example, disk clutches, as in the embodiment example shown in FIG. 1, it is generally arranged so as to ensure a tight engagement between the cover 28 and the clutch housing formed by the transmission housing casing 18. This tight engagement can be produced, for example, by means of an O-ring or some other sealing ring. FIG. 1 shows a sealing ring 32 with two sealing lips.

A clutch hub 34, including two annular portions 36, 38 which are secured to one another for reasons which will be explained in the following, serves as input side of the dual clutch 12. The clutch hub 34 extends through a central opening of the cover 28 in the direction of the drive unit and is coupled via an external toothing 42 with the torsional vibration damper, not shown, so that there is a torque-transmitting connection between the coupling end 16 of the crankshaft 14 and the coupling hub 34 by means of this torsional vibration damper. If a torsional vibration damper is not desired at this location in the drivetrain, or at all, the clutch hub 34 can also be coupled directly to the coupling end 16. The pump drive shaft 26 has an external toothing 44 at its end remote of the transmission which engages in an internal toothing 46 of the annular portion 36 of the clutch hub 34, so that the pump drive shaft 26 rotates along with the clutch hub 34 and accordingly drives the oil pump when a rotational movement is imparted to the clutch hub 34, generally by the drive unit and in many operating situations possibly also by the transmission via the dual clutch 12 (for example, in an operating situation characterized by the term "engine braking").

The cover 28 extends radially between an annular circumferential wall portion of the housing casing 18 defining a radial recess 50 of the housing casing 18 and the annular portion 38 of the hub 34. It is advantageous when a seal arrangement and/or pivot bearing arrangement 54 is provided between a radial inner wall area 52 of the cover 28 and the hub 34, especially the annular portion 38, especially when, as in the illustrated embodiment example the cover 28 is secured to the housing casing 18 and therefore does not rotate along with the dual clutch 12. A seal between the cover 28 and the hub 34 is required particularly when the clutch arrangements of the dual clutch 12 are wet clutches as in this embodiment example. Highly reliable operation is also achieved in case of occurring oscillations and vibrations when the seal arrangement and/or pivot bearing arrangement 54 are/is secured axially at the cover 28 and/or at the clutch hub 34, for example, by an end portion of the cover edge 52 that is bent radially inward, as is shown in FIG. 1.

A support plate 60 which serves to transmit torque between the hub 34 and an outer disk carrier 62 of a first multi-disk clutch arrangement 64 is arranged at the annular portion 38 of the hub 34 so as to be fixed with respect to rotation relative to it. The outer disk carrier 62 extends in the direction of the transmission and radially inward to an annular part 66 at which the outer disk carrier is arranged so as to be fixed with respect to rotation relative to it and which is rotatably supported at the two transmission input shafts 22 and 24 by means of an axial and radial bearing arrangement 68 in such a way that radial as well as axial forces are supported at the transmission input shafts. The axial and radial bearing arrangement 68 makes possible a relative rotation between the annular part 66 on the one hand and transmission input shaft 22 and transmission input shaft 24 on the other hand. The construction and operation of the axial and radial bearing arrangement will be discussed more fully later on.

An outer disk carrier 70 of a second multi-disk clutch arrangement 72 is arranged at the annular part 66 farther axially in the direction of the drive unit so as to be fixed with respect to rotation relative to it, its disk set 74 being surrounded annularly by the disk set 76 of the first multi-disk clutch arrangement. As was already indicated, the two outer disk carriers 62 and 70 are connected with one another by the annular part 66 so as to be fixed with respect to relative rotation and are jointly in a torque-transmitting connection with the clutch hub 34 and therefore—via the torsional vibration damper, not shown—with the crankshaft 14 of the drive unit by means of the carrier plate 60 which is in a positive-locking torque-transmitting engagement with the outer disk carrier 62 by means of an external toothing. Referring to the normal flow of torque from the drive unit to the transmission, the outer disk carriers 62 and 70 serve as input side of the multi-disk clutch arrangement 64 and 72, respectively.

A hub part 80 of an inner disk carrier 82 of the first multi-disk clutch arrangement 64 is arranged on the transmission input shaft 22 so as to be fixed with respect to rotation relative to it by means of a spline or the like. In a corresponding manner, a hub part 84 of an inner disk carrier 86 of the second multi-disk clutch arrangement 72 is arranged on the radial outer transmission input shaft 24 so as to be fixed with respect to rotation relative to it by means of a spline or the like. Referring to the regulating torque flow from the drive unit in the direction of the transmission, the inner disk carriers 82 and 86 serve as output side of the first and second multi-disk clutch arrangements 64 and 72.

Referring again to the radial and axial bearing support of the annular part 66 at the transmission input shafts 22 and 24, two radial bearing subassemblies 90 and 92 acting between the radial outer transmission input shaft 24 and the annular part 66 serve as radial support of the annular part 66. With regard to a support in the direction of the drive unit, the axial bearing support of the annular part 66 is carried out by means of hub part 84, an axial bearing 94, hub part 80 and a snap ring 96 which secures the hub part 80 axially to the radial inner transmission input shaft 22. The annular part 38 of the clutch hub 34 is supported in turn via an axial bearing 68 and a radial bearing 100 at the hub part 80. The hub part 80 is supported axially in the direction of the transmission at an end portion of the radial outer transmission input shaft 24 by the axial bearing 94. Hub part 84 can be supported at the transmission input shaft 24 directly at an annular stop or the like or at a separate snap ring or the like in the direction of the transmission. Since the hub part 84 and the annular part 66 are rotatable relative to one another, an axial bearing can be provided between these components insofar as the bearing 92 does not function as both axial bearing and radial bearing. The latter is assumed with regard to the embodiment example in FIG. 1.

Great advantages result when, as in the present embodiment example, the portions of the outer disk carriers 62 and 70 extending in radial direction are arranged on one axial side of a radial plane extending orthogonal to an axis A of the dual clutch 12 and the portions of the inner disk carriers 82 and 86 of the two multi-disk clutch arrangements extending in radial direction are arranged on the other axial side of this radial plane. This allows a particularly compact construction, particularly when—as in the present embodiment example—disk carriers of one type (outer disk carrier 62, 70 as in the embodiment example or inner disk carrier 82, 86) are connected with one another so as to be fixed with respect to relative rotation and serve in each instance as the input side of the respective multi-disk clutch arrangement with respect to the flow of force from the drive unit to the transmission.

Actuation pistons for actuating the multi-disk clutch arrangements are integrated in the dual clutch 12 in order to actuate the multi-disk clutch arrangements for engagement in the case of the present embodiment example. An actuation piston 110 associated with the first multi-disk clutch arrangement 64 is arranged axially between the radially extending portion of the outer disk carrier 62 of the first multi-disk clutch arrangement 64 and the radially extending portion of the outer disk carrier 70 of the second multi-disk clutch arrangement 72 and is guided so as to be axially displaceable at both outer disk carriers and at the annular portion 66 by means of seals 112, 114, 116 and so as to seal a pressure chamber 118 formed between the outer disk carrier 62 and the actuation piston 110 and a centrifugal force pressure compensation chamber 120 formed between the actuation piston 110 and the outer disk carrier 70. The pressure chamber 118 communicates, via a pressure medium channel 122 formed in the annular portion 66, with an associated hydraulic master cylinder, e.g., master cylinder 230. The pressure medium channel 122 is connected to the master cylinder via a connection sleeve which receives the annular part 66 and which is possibly fixed with respect to the transmission. The connection sleeve and the annular part 66 form a rotational connection. With regard to the annular part 66, it should be noted in this connection that for purposes of a simpler manufacture particularly with respect to the pressure medium channel 122 and another pressure medium channel this annular part 66 is produced in two parts with two sleeve-like ring part segments which are inserted one into the other as is shown in FIG. 1.

An actuation piston 130 associated with the second multi-disk clutch arrangement 72 is arranged axially between the outer disk carrier 70 of the second multi-disk clutch arrangement 72 and a substantially radially extending wall part 132 arranged at an axial end region of the annular part 66 remote of the transmission so as to be fixed with respect to rotation relative to it and so as to be tight against fluid and is guided so as to be axially displaceable by means of seals 134, 136 and 138 at the outer disk carrier 70, the wall part 132 and the annular part 66 and so as to seal a pressure chamber 140 formed between the outer disk carrier 70 and the actuation piston 130 and a centrifugal force pressure compensation chamber 142 formed between the actuation piston 130 and the wall part 132. The pressure chamber 140 is connected via another pressure medium channel 144 (already mentioned) in a manner corresponding to pressure chamber 118 at an associated master cylinder, e.g., master cylinder 236. An actuating pressure can be applied to the two pressure chambers 118 and 140 selectively (possibly also simultaneously) by means of the master cylinders in order to actuate the first multi-disk clutch arrangement 64 and/or the second multi-disk clutch arrangement 72 for purpose of engagement. Diaphragm springs 146, 148 serve to restore, that is, to release, the clutches; the diaphragm spring 148 associated with the actuation piston 130 is received in the centrifugal force pressure compensation chamber 142.

The pressure chambers 118 and 140 are completely filled with pressure medium (in this case hydraulic oil) in every case during normal operating states of the dual clutch 12 and the actuating state of the multi-disk clutch arrangements, per se, depends on the pressure of the pressure medium applied to the pressure chambers. However, since the outer disk carriers 62 and 70, including the annular part 66 and the actuation piston 110 and 130 and the wall part 132, rotate together with the crankshaft 14 in driving operation, pressure increases in the pressure chambers 118 and 140 which are caused by centrifugal force are brought about even when no pressure is applied to the pressure chambers on the part of the pressure control device, which increases could lead to an unwanted engagement or at least slippage of the multi-disk clutch arrangements at least at higher rotational speeds. The centrifugal force pressure compensation chambers 120, 142, already mentioned, which receive a pressure compensation medium and in which pressure increases occur correspondingly as a result of centrifugal force, which pressure increases compensate for the pressure increases caused in the pressure chambers by centrifugal force, are provided for this reason.

It is also possible to fill the centrifugal force pressure compensation chambers 120 and 142 permanently with pressure compensation medium, for example, oil, wherein, as the case may be, a volume compensation could be provided to absorb pressure compensation medium displaced in the course of actuating the actuation pistons. In the embodiment form shown in FIG. 1, the centrifugal force pressure compensation chambers 120, 142 are first filled with pressure compensation medium during operation of the drivetrain, specifically in connection with the supply of cooling fluid, particularly cooling oil in the shown embodiment example, to the multi-disk clutch arrangements 64 and 72 via an annular channel 150 formed between the annular part 66 and the outer transmission input shaft 24, with which the bearings 90, 92 which pass the cooling oil are associated. The cooling oil which is supplied, as the case may be, by pump 220 flows from a transmission-side connection between the annular part and the transmission input shaft 24 in the direction of the drive unit through bearing 90 and bearing 92 and then flows in a partial flow between the end portion of the annular part 66 remote of the transmission and the hub part 84 radially outward in the direction of the disk set 74 of the second multi-disk clutch arrangement 72, enters the area of the disks through the passages in the inner disk carrier 86, flows radially outward between the disks of the disk set 74 and through friction lining grooves, or the like, of these disks, enters the area of the disk set 76 of the first multi-disk clutch arrangement 64 through passages in the outer disk carrier 70 and through passages in the inner disk carrier 82, flows radially outward between the disks of this disk set and through lining grooves, or the like, in these disks and then, finally, flows off radially outward through passages in the outer disk carrier 62. The centrifugal force pressure compensation chambers 120, 142 are also connected to the cooling oil supply between the annular part 66 and the transmission input shaft 24, specifically by means of radial bore holes 152, 154 in the annular part 66. Due to the fact that the cooling oil serving as pressure compensation medium in the pressure compensation chambers 120, 142 flows off out of the pressure compensation chambers due to the absence of centrifugal force when the drive unit is stationary, the pressure compensation chambers are refilled again during the operation of the drivetrain (of the motor vehicle).

Since a pressure application surface of the actuation piston 130 associated with the pressure chamber 140 is smaller and also does not extend as far radially outward as a pressure application surface of the piston 130 associated with the pressure compensation chamber 142, at least one fluid level limiting opening 156 is formed in the wall part 132 and adjusts a maximum radial fluid level of the pressure compensation chamber 142 providing the required centrifugal force compensation. When the maximum fluid level is reached, the cooling oil supplied via the bore hole 154 flows off through the fluid level limiting opening 156 and combines with the cooling oil flowing radially outward between the annular part 66 and the hub part 84. In the case of the piston 110, the pressure application surfaces of the piston which are associated with the pressure chamber 118 and the pressure application surfaces of the piston which are associated with the pressure compensation chamber 120 are of the same size and extend in the same radial area so that corresponding fluid level limiting means are not required for the pressure compensation chamber 120.

For the sake of completeness, it should be noted that additional cooling oil flows preferably occur in operation. Accordingly, at least one radial bore hole 160 is provided in the transmission input shaft 24, a further partial flow of cooling oil flows via this radial bore hole 160 and via an annular channel between the two transmission input shafts and splits into two partial flows, one of which flows radially outward between the two hub parts 80 and 84 (through the axial bearing 94) and the other partial flow flows radially outward between the end area of the transmission input shaft 22 remote of the transmission and the hub part 80 and between this hub part 80 and the annular portion 38 of the clutch hub 34 (through the bearings 98 and 100).

The person skilled in the art can easily gather further details of the dual clutch 12 according to the described embodiment example from FIG. 1. Accordingly, the axial bore hole in the annular portion 36 of the clutch hub 34 in which the internal toothing 46 for the pump drive shaft is formed is closed in an oil-tight manner by a stopper 180 which is held therein. The carrier plate 60 is fixed axially at the outer disk carrier 62 by two retaining rings 172, 174, the retaining ring 172 also supports the end disk 170 axially. A corresponding retaining ring is also provided for supporting the disk set 74 at the outer disk carrier 70.

With regard to further details and advantageous constructions of the dual clutch 12, reference is made to the patent documents previously cited. It is noted in this connection that FIG. 1 of the present application corresponds to FIG. 1 of these patents.

The dual clutch described with reference to FIG. 1 will be explained in more detail with respect to the bearing support at the transmission input shafts referring to FIG. 2. The dual clutch 10 in FIG. 2 corresponds essentially to the dual clutch in FIG. 1; slight discrepancies that can be seen from a comparison of the drawings are not relevant in this respect.

The clutch 10 is supported by the radial bearings 90 and 92 on the radial outer transmission input shaft 24. In addition, the input hub 34 is supported via the radial bearing 100 on the hub 80 of the inner disk carrier 82 and is supported via the latter on the inner transmission input shaft 22. The radial bearings 90, 92 and 100 are pressed in from the outside and the bearing support is carried out at the inner diameter in the direction of the respective adjacent structural component part (24 or 80).

The dual clutch 10 is supported axially via the hub 80 of the inner disk carrier 82 at the front side of the radial outer transmission input shaft 24 on one side and at the snap ring 96 inserted in the radial inner transmission input shaft 22 on the other side. Depending on the tolerance position, at least one compensation sleeve can also be inserted between the hub 80 and the snap ring 96. The axial support/bearing between the transmission input shafts 22 and 24 running at different rotational speeds is carried out by means of the axial bearing 94. Further, the hub 80 and the input hub 34 are supported axially at one another via the axial bearing 98. The ring part 66, which can also be designated as a coupling hub, is supported axially 86 at the hub 84 of the inner disk carrier via the front side of the radial bearing 92 which carries out an axial supporting function.

In the type of construction shown here, the axial bearing 94 rotates at the rotational speed of the hub 80 and accordingly slides on the transmission input shaft 24. In case of a loose fit on the hub 80, the sliding movement can also be carried out between the axial bearing 94 and the hub 80. Such loosening can occur, for example, when the axial bearing 94 has been secured to the hub 80 by pressing but has loosened due to thermal expansion. In case of a "floating" axial bearing, sliding can also occur on both sides.

The front side of the radial outer transmission input shaft 24 serving as a contact surface is relatively small, particularly when a bevel is provided as is the case in the present embodiment example. When the axial bearing 94 is pressed on the hub 80, it slides on this very small end face. In addition to the load on this bearing due to sliding, further loading can be caused by axial shocks on the bearing which can occur particularly with alternating torque due to helical gear wheels and axial movements of the shaft induced by this.

Figure 2:
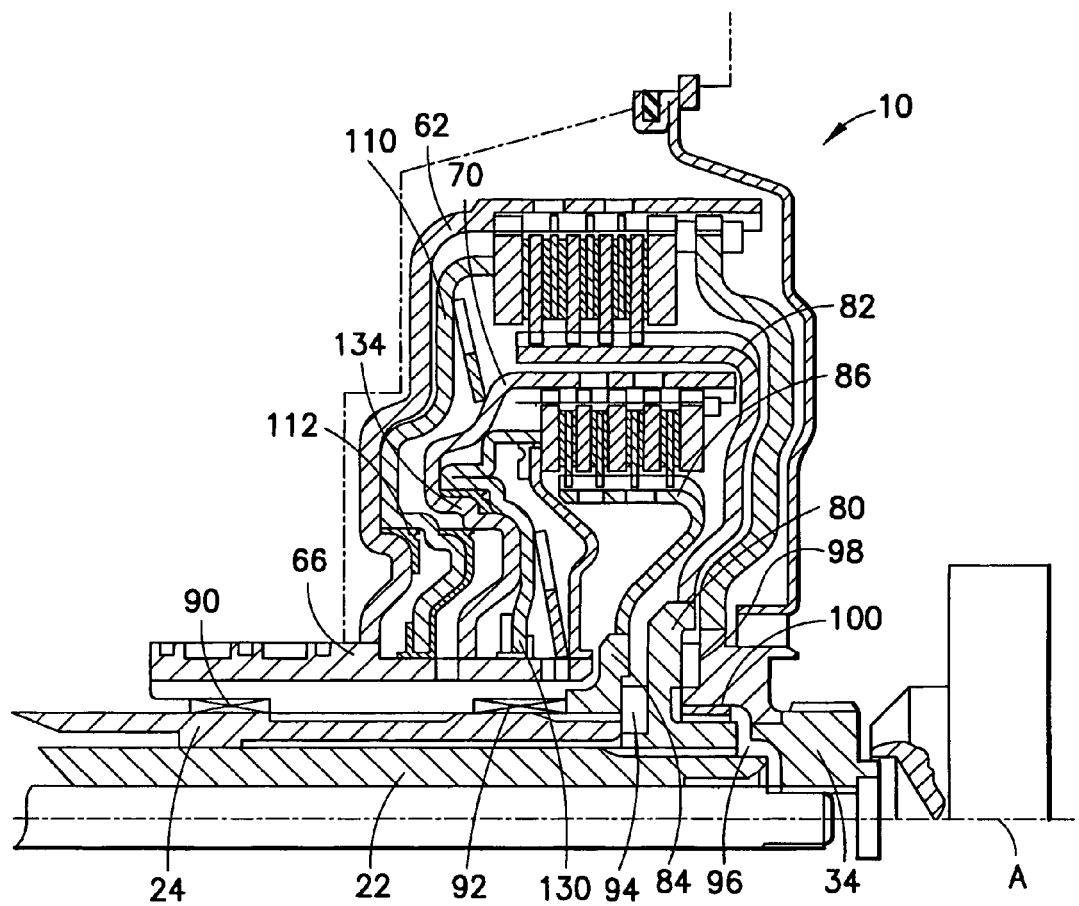
FIG. 2 is a partial cross-sectional view of a dual clutch which essentially corresponds to the dual clutch in FIG. 1, wherein only components that are relevant to the bearing concept and the sealing concept presented herein are identified.
Figure 3:
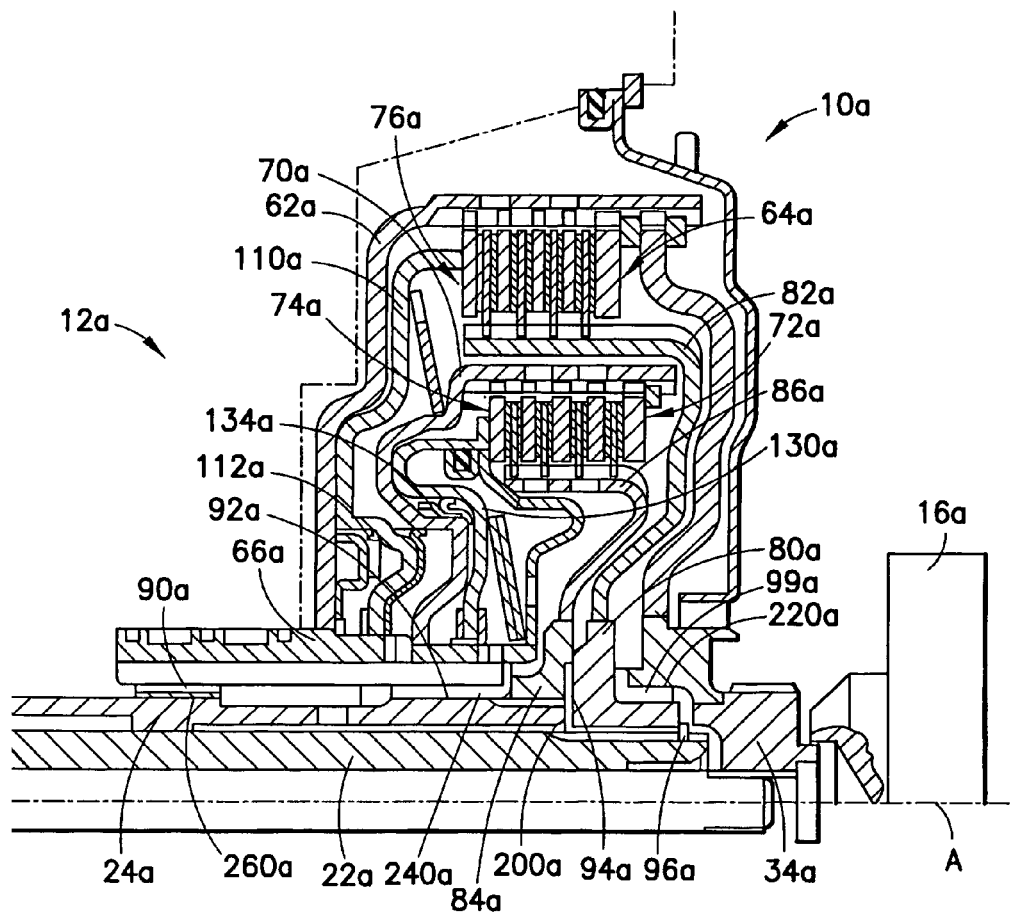
FIG. 3 is a partial cross-sectional view of a dual clutch according to the present invention.

A modified bearing concept, explained more fully in the following with reference to FIG. 3, is realized in the dual clutch 10a in FIG. 3 for purposes of the highest possible stability of the different bearing locations. Only the differences with respect to the embodiment examples according to FIGS. 1 and 2 are discussed and the reference numbers from FIGS. 1 and 2 are supplemented by an "a" when there is a corresponding component in the examples of FIGS. 1 and 2.

The axial bearing 94a between the hub 80a on the one side and the hub 84a and the end face of the radial outer transmission input shaft 24a on the other side has a bearing plate 200a which is shown in detail in FIG. 4 and which is connected to the transmission input shaft 24a for common rotation. More precisely, the bearing plate is secured to the hub 84a axially and is prevented from rotating; this is ensured by a mutual driving profile. Because of this protection against rotation relative to the hub 84a and accordingly relative to the radial outer transmission input shaft 24a, the axial support of the axial bearing 94a toward the front side of the transmission input shaft 24a changes to a purely static support which is accordingly not subject to any stresses by friction caused by relative rotation. The sliding surface 202a of the axial bearing 94a, more precisely the bearing plate 200a, is oriented toward the hub 80a of the inner disk carrier 82a. This hub can provide a substantially larger counter-sliding surface so that the surface portions sliding against one another can be appreciably larger and can accordingly achieve an appreciably smaller loading of the axial bearing. The sliding surface can be constructed with pressed in grooves 204a to reinforce the sliding by the lubricating effect of cooling oil.

The axial bearing 94a, more precisely the bearing plate 200a, is preferably constructed with a steel back (toward the hub 84a and end face of the transmission input shaft 24a) forming a bearing surface 203a and a sliding coat or layer 208a on the front side (toward the hub 80a). The above-mentioned shock loading toward the small end face of the transmission input shaft 24a can therefore be supported statically by the steel back. If necessary, the steel back can be hardened in order to improve ability to withstand impact. Conventional materials such as bronze, aluminum, polytetrafluoroethylene (Teflon) and graphite may be used for the sliding layer.

The surface quality of the support surface of the bearing plate 200a toward the hub 84a can be constructed comparatively modestly. However, the running surface (counter-sliding surface) of the hub 80a should have a comparatively high surface quality. It may be advisable to harden this running surface depending on the bearing material of the axial bearing 94a.

Figure 4A:
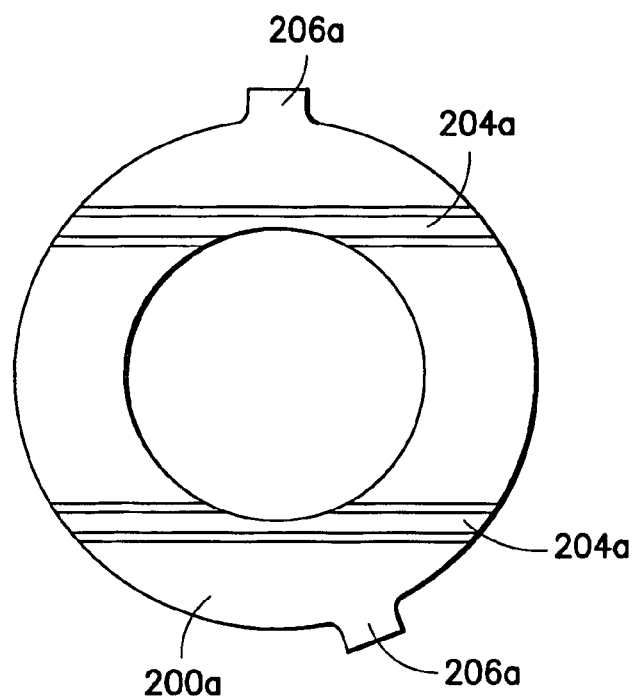
FIGS. 4a, b, and c are multiple views of a bearing plate which is used according to the bearing concept.

The prevention of rotation of the bearing plate 200a at the hub 84a can be a positive engagement, for example, by means of irregularities in the outer diameter of the bearing plate 200a (see FIG. 4a). For example, grooves, cams or flattened portions can be provided at the outer diameter. In case of the bearing ring 200a of FIG. 4, driving cams 206a are provided. In contrast to FIG. 4a, one of the two cams 206a can be wider in circumferential direction or at least one other asymmetrically arranged cam can be provided in order to ensure the proper installation of the plate 200a (sliding surface 202a faces forward in direction of the hub 80a). The hub 84a can then be provided with a corresponding counter-contour which can be produced, for example, by cold forming. The bearing ring 200a can also be fixed to the hub 84a in a positive engagement, for example, by caulking. Alternatively, the fixation and prevention of rotation can also be carried out by a material engagement, for example, by welding the bearing plate 200a to the hub 84a.

Figure 4B:
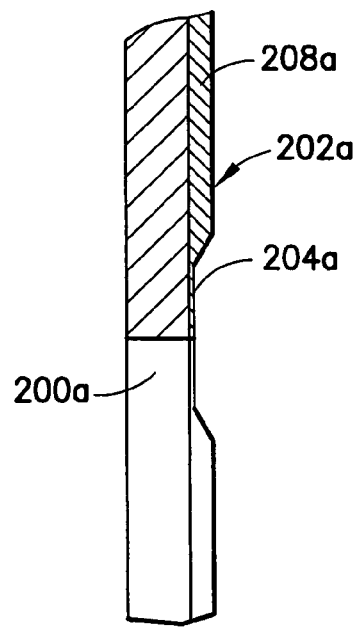
Figure 4C:
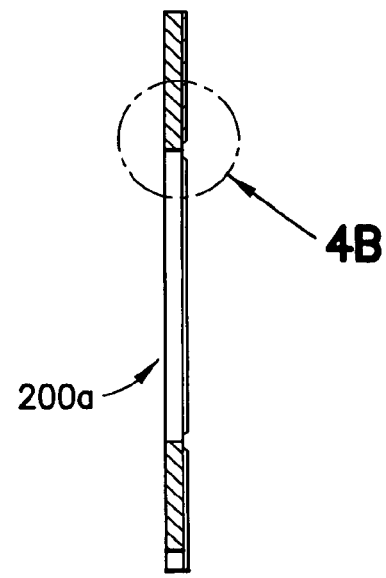

In the embodiments of the dual clutches 10 of FIGS. 1 and 2, all bearings were constructed as solid structural component parts of bearing bronze. For the embodiment example in FIG. 3, it is suggested that all bearings are constructed with steel backs and a sliding layer applied to the latter (e.g., bronze, aluminum, Teflon, etc.). In FIG. 4b, the sliding layer of the bearing plate 200a is designated by 208a. FIG. 4b shows detail E from FIG. 4c.

As a rule, it is advantageous when bearing components and the adjacent structural component parts of the clutch supported by the bearing components exhibit the same or similar thermal expansion behavior, so as to prevent extreme stresses and consequent loosening. This is the case for the bearing components with steel backs when the adjacent clutch parts, in this case particularly the various hubs, are produced from steel. The sliding behavior can be optimized without impairing the stability of the overall structural component part in that the sliding layer is separate from the steel back.

Figure 5A:
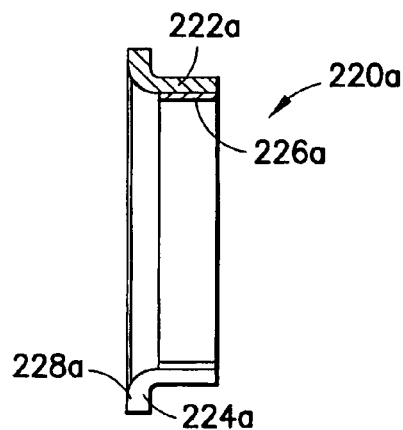
FIGS. 5a and b are views of a collar bushing or flange sleeve used according to the bearing concept.
Figure 5B:
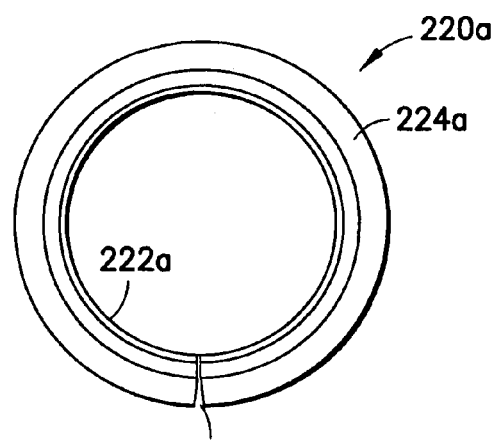

In the embodiment example in FIG. 3, an axial and radial bearing 99a which is formed by a flange sleeve 220a and is shown in FIG. 5 is provided instead of the axial bearing 98 and radial bearing 100. The flange sleeve has a sleeve portion 222a which may be slit and a flange portion 224a, both of which are constructed with a sliding layer 226a and 228a, respectively. The respective sliding layer is provided at the inner circumference of the sleeve portion 22a and at the end face of the flange portion 224a facing the hub 80a. FIG. 5 shows a manufactured slot 230a in the sleeve portion and in the flange portion. Assembly is made more economical by integrating an axial bearing and radial bearing in a single structural component part. This can also reduce machining at the adjacent structural component parts. In order to improve the sliding behavior, the flange sleeve can be constructed with stamped oil channels or the like. Oil can be supplied, for example, through the toothing between the hub 80a and the transmission input shaft 22a. In order to provide an oil channel, one or more teeth of the toothing can be omitted, for example.

In the embodiment example in FIG. 3, the bearing 92a is constructed with a flange sleeve 240a. Like the flange sleeve 220a, the flange sleeve 240a shown in FIG. 6 has a steel back and sliding layers arranged on it. A sliding layer 242a is provided at the inner circumference of the sleeve portion 244a. Another sliding layer 246a is provided at the front side of the flange portion 248a. The outer circumference of the sleeve portion 244a contacts the inner circumference of the ring part 66a shown in FIG. 8. This inner circumference is constructed with cooling oil guide grooves 250a which form cooling oil guiding channels together with the outer circumferential surface of the sleeve portion 244a. The flange portion 248a has passage cutouts 252a for the cooling oil to pass into the interior of the dual clutch between the end of the ring part 66a and the hub 84a. The cooling oil supply is carried out from the transmission along the outer circumference of the bearing sleeve 260a of the bearing 90a shown in FIG. 7, namely, through the cooling oil guiding grooves 250a which were mentioned above. Different bore holes forming pressure oil supply channels and connections to the hydraulic slave cylinders of the two clutch arrangements or connections to a pressure oil supply are shown in the different parts of FIG. 8 (FIG. 8a is a section along line A—A of FIG. 8b).

With respect to the flange sleeve 240a and its passage cutouts 252a, it is noted that the passage cutouts 252a are preferably dimensioned in such a way that a defined backup of cooling oil is provided for. In this way, an oil flow is supported against the centrifugal force through the bore hole 160a between the shaft 24a and 22a and the oil supply of the bearing 99a is therefore improved. An additional reinforcing of the oil flow to the bearing 99a can be effected in that the oil flow can reach the bearing 99a through at least one bore hole in the hub 80a proceeding from the gap between the shaft 22a and the shaft 24a. As was already indicated above, the bearing 99a can also be supplied with oil alternatively or additionally through at least one passage between the hub 80a and the transmission input shaft 22a. In this way, a correspondingly arranged profile geometry can be provided for the coupling geometry acting between the hub 80a and the shaft 22a, which profile geometry, for example, provides sufficient free cross section in the profile base for a longitudinal throughflow of the profiles of shaft 22a and hub 80a or has omitted teeth in the profile. In addition, it is recommended then that the oil flow is guided radially outward, e.g., through grooves provided at the front side in the hub 80*a* toward the compensation disk or the snap ring 96*a*, as the case may be.

Figure 6A:
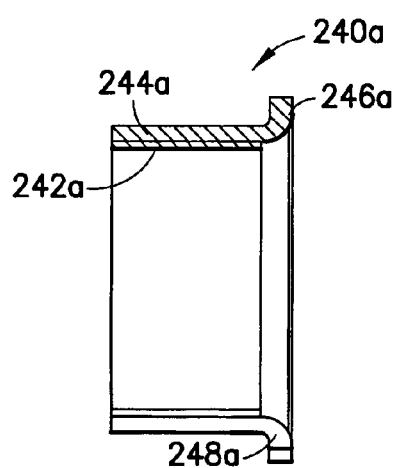
FIGS. 6a and b are views of another flange sleeve used according to the bearing concept.
Figure 6B:
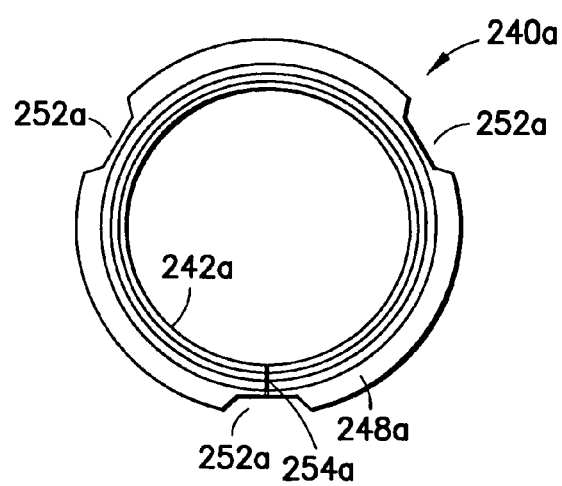
Figure 7A:
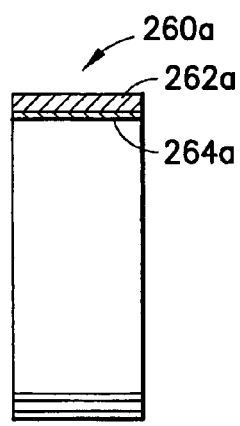
FIGS. 7a and b are views of a bearing sleeve.
Figure 7B:
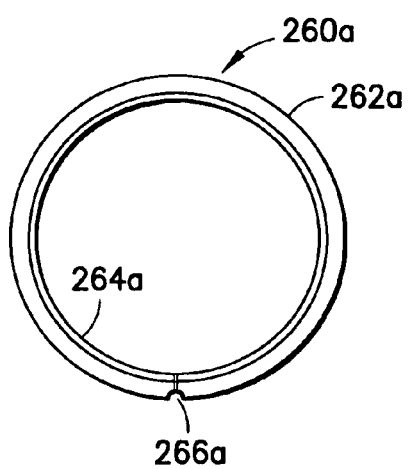
Figure 9:
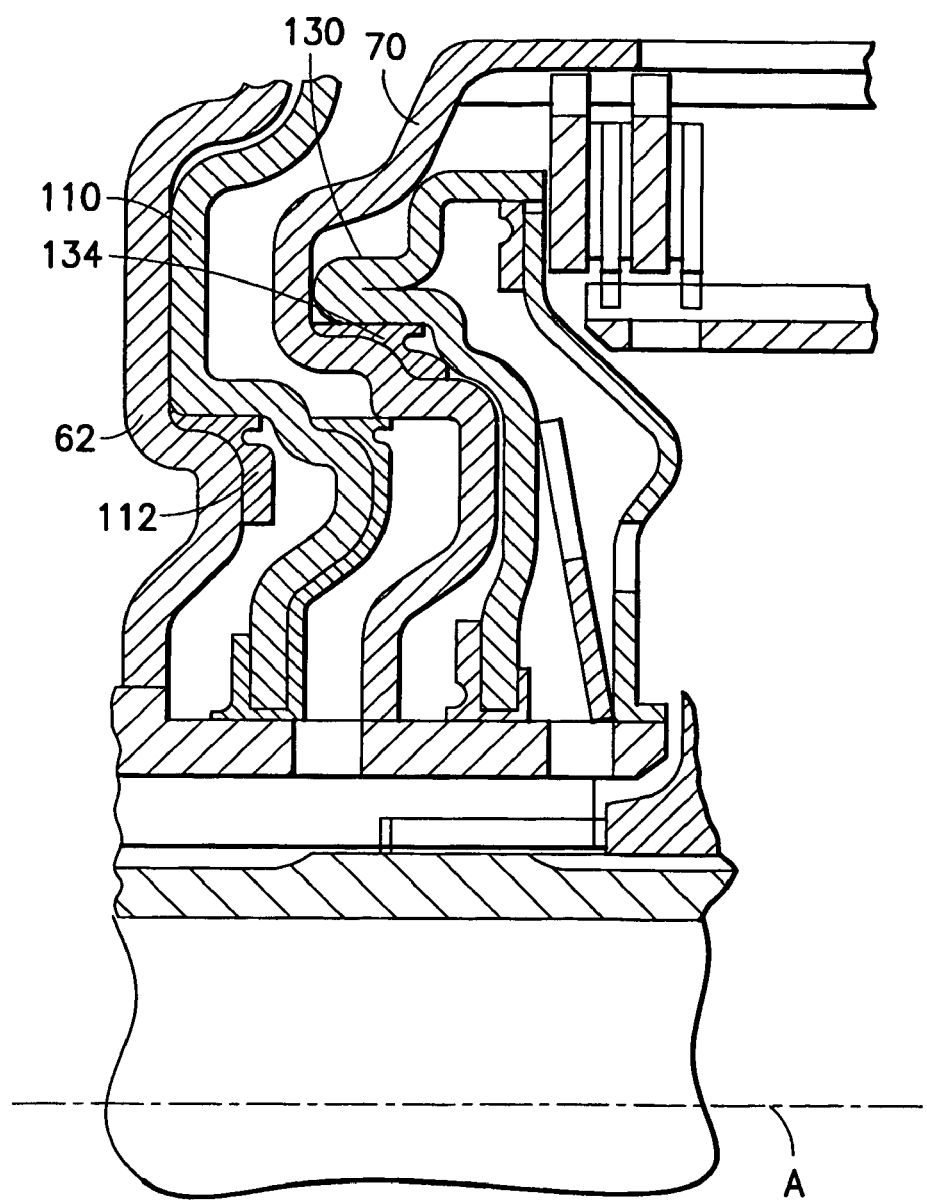
FIG. 9 is a view of an enlarged detail from FIG. 2 in the area of the actuating piston and pressure chambers.

With regard to the bearing sleeve 260*a*, this is preferably also constructed with a steel back 262*a* and siding layer 264*a* provided at its inner circumference. Like the flange sleeve 240*a*, the bearing sleeve can also be slit. FIGS. 6 and 7 show a manufactured slit 254*a* and 266*a*, respectively.

Due to the fact that the bearing 92*a* carrying out the axial supporting function is constructed with the flange sleeve 240*a*, the axial running surface provided by the bearing is substantially larger than in the embodiment example of FIG. 2. Accordingly, the bearing can be loaded by axial forces, possibly, shocks, to a substantially greater degree. The thermal advantages mentioned above and a particularly low-friction operation result when a flange sleeve with steel back and sliding surface is used.

As a whole, the bearing concept realized in the embodiment example of FIG. 3 provides for a greater load capacity and improved stability of the various bearing surfaces.

An aspect of some importance in a clutch device with integrated actuating cylinder is the sealing of the actuating cylinder pressure space, particularly the manner in which the seal acting between the piston and the cylinder wall defining the pressure space is realized. In general, seals provided for this purpose can be fixedly connected either to the cylinder wall which may be formed by the outer disk carrier or to the piston and slide in a sealing manner on the oppositely located piston or cylinder wall (possibly the outer disk carrier).

In the sealing concept in FIGS. 1 and 2, the seals 112 and 134 provided for this purpose are arranged directly at the respective outer disk carrier 62, 72 which carries and stabilizes these seals. For example, the seals can be vulcanized on the respective carrier. The seals can also be arranged on the carrier by means of an injection molding process or pressing process.

Such methods for providing the disk carrier with the seals require clamping of the carrier component in a die or tool which can result in a relatively large amount of waste and can limit the number of seals that can be produced in one production pass.

Figure 11:
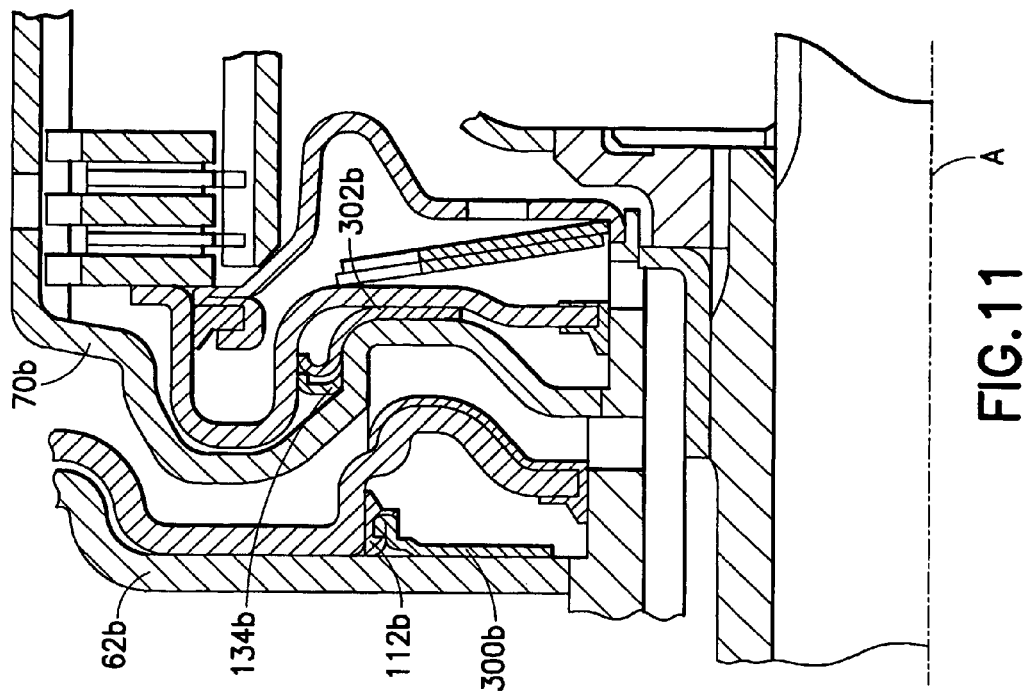
FIG. 11 is a view corresponding to FIG. 10 of seals acting between the outer disk carriers and the actuating piston according to an embodiment of the sealing concept.
Figure 10:
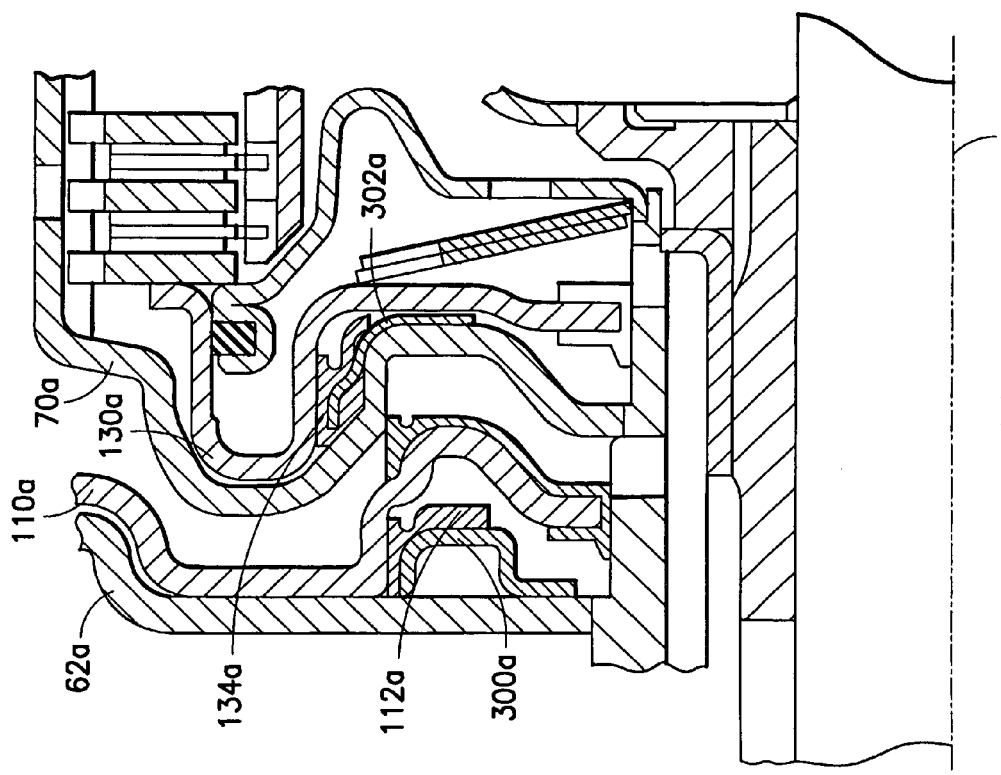
FIG. 10 is a view of an enlarged detail from FIG. 3 in the area of the actuating piston and the pressure chambers to illustrate the sealing concept presented herein for sealing the pressure chambers.

In contrast, a different sealing concept is realized in the dual clutches of FIGS. 3, 10 and 11 which provides for the use of a separate seal element carrier.

Referring to FIG. 3 and FIG. 10, the seal between the outer disk carrier 62*a* and the actuating piston 110*a* is carried out by means of a seal element 112*a* which is arranged, for example, vulcanized or pressed, on a carrying element 300*a* separate from the outer disk carrier 62*a*. The carrying element 300*a* can also be provided with the seal element 112*a*, by molding on or molding around. The carrying element 300*a* is advantageously constructed as a disk-shaped sheet metal part, possibly a sheet steel part, and is preferably arranged on, e.g., welded to, the outer disk carrier 62*a*. It would also be possible to press the carrying element 300*a* on the outer disk carrier 62*a* or to lock or clip it on the outer disk carrier 62*a*. The disk carrier cannot be produced with faulty seals because the seal arrangement formed by the carrying element 300*a* and the seal 112*a* can be checked before arranging the carrying element at the outer disk carrier in order to determine whether it has been properly produced and corresponds to specifications. This appreciably reduces waste from scrapped disk carriers.

Figure 14:
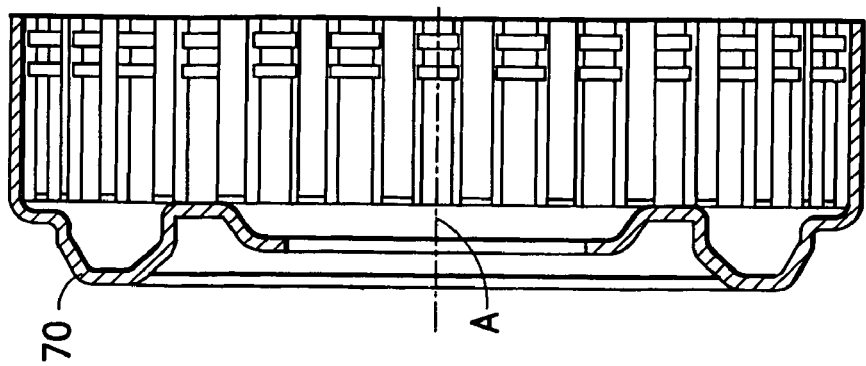
FIG. 14 is a partial cross-sectional view showing an inner disk carrier of a dual clutch corresponding to the embodiment example in FIG. 3.
Figure 13:
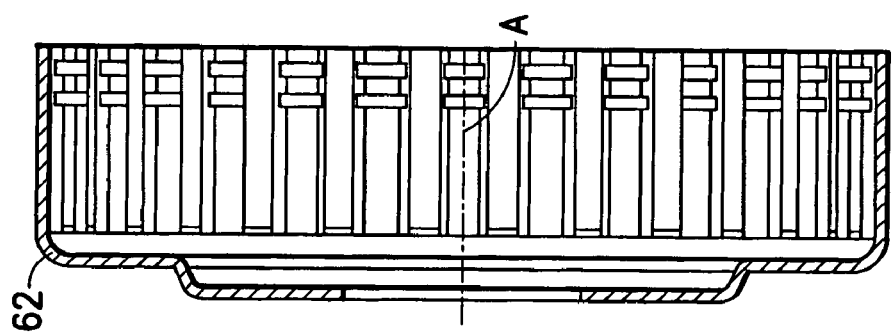
FIG. 13 is a partial cross-sectional view of an outer disk carrier of a dual clutch corresponding to the embodiment example in FIG. 3.
Figure 12:
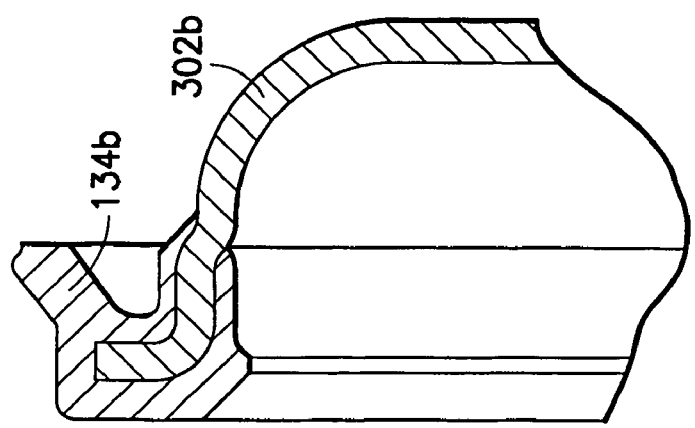
FIG. 12 is a partial cross-sectional view showing a seal element holder, including a vulcanized seal element, for sealing the pressure chambers of the radial inner clutch arrangement according to the constructional variant shown in FIG. 11.

In a corresponding manner, the seal 134*a* acting between the piston 130*a* and the outer disk carrier 70*a* is held by a carrying element 302*a* which is separate from the outer disk carrier 70*a* and which was arranged on the outer disk carrier 70*a* subsequently after forming the seal 134*a* on the carrying element 300*a*. The carrying element 302*a* which is likewise preferably constructed as a disk-shaped sheet metal part can also be fastened to the outer disk carrier 70*a* in a variety of ways, for example, welded, pressed on, locked or clipped. The carrying element can be constructed in many possible ways in principle. FIG. 11 shows a constructional variant with different arrangement of carrying elements 300*b* and 302*b* and differently constructed seals 112*b* and 134*b*. The sealing arrangement formed by the seal 134*b* and the carrying element 302*b* is shown in detail in FIG. 12. FIGS. 13 and 14 show suitable outer disk carriers for the construction of a dual clutch according to the invention. Radial oil passages, not shown in FIGS. 13 and 14, are provided in the outer disk carriers.

Many advantages result when the seals are not directly arranged, for example, not directly vulcanized, on the outer disk carrier but, rather, are manufactured as separate components. Accordingly, the number of sealing component parts that can be produced in one production pass is appreciably increased because no large carrier components need be inserted into a tool. Further, the risk that a comparatively large number of relatively expensive (large) carrier components will be lost through waste is reduced. As was made clear in the preceding, the seal 112*a*, 112*b*, 134*a*, 134*b* can be arranged and fixed on the respective structural component part, in this case, the respective outer disk carrier 62*a*, 70*a*, subsequently according to the sealing concept presented herein. This can be carried out by means of positive engagement, frictional engagement or material engagement. The seals 112*a*, 112*b*, 134*a*, 134*b* can be manufactured as composite component parts together with a respective substrate, for example, a steel carrier plate, and then arranged, for example, welded, at the associated clutch component part, particularly the outer disk carrier 70*a* of the inner clutch or the outer disk carrier 62*a* of the outer clutch. The alternative fastening possibilities of pressing on and clipping have already been mentioned. In some cases, the carrying elements could also possibly be glued to the associated clutch component.

A suitable seal geometry which compensates for slight dimensional deviations and tolerances and accordingly ensures a secure sealing of the pressure chambers of the actuating cylinders can also be selected particularly when the connection between the carrying element and associated clutch component is not carried out by a surrounding material engagement.

Referring to another difference between the embodiment of FIG. 1 and FIG. 2 and the embodiments of FIG. 3; in the radial outer clutch arrangement 64 according to FIGS. 1 and 2, the outer disks coupled to the outer disk carrier 62 are constructed as lining-carrying disks and consequently the inner disks coupled to the inner disk carrier 82 are constructed without linings, whereas, in the radial inner clutch arrangement 72 the outer disks coupled to the outer disk carrier 70 are constructed as unlined disks and, consequently, the inner disks coupled to the inner disk carrier 86 are constructed as lining-carrying disks. The above-mentioned allocation of the outer disks and inner disks with respect to the radial outer clutch arrangement 64 is based on the consideration that the lining-carrying disks are generally constructed with lining slots and should be associated with the input side of the clutch device 10 in order to reinforce the cooling of the radial outer clutch arrangement 64, so that they constantly rotate along with the engine (also in the disengaged state of the clutch arrangement) in order at least to contribute to the delivery of cooling oil through the disk set, particularly through centrifugal force.

In contrast to this, according to the design in FIG. 3, the inner disks coupled to the respective transmission input shaft, that is, on the output side, are constructed as lining-carrying disks and the outer disks arranged on the input side are constructed as unlined disks for the radial outer clutch arrangement 64a as well as for the radial inner clutch arrangement 72a. Therefore, a cooling delivery effect of lining slots formed in the disk linings can not occur until the inner disks also rotate. It has been shown that a sufficient cooling action is achieved in spite of this.

An identical allocation of the lining-carrying disks and the unlined disks to the outer disk carrier 62a and 70a, respectively (as outer disks) and to the inner disk carrier 82a and 86a, respectively, (as inner disks) for the radial outer clutch arrangement 64a as well as the radial inner clutch arrangement 72a offers the substantial advantage that costs can be considerably reduced. When all unlined disks 76a of the radial outer clutch arrangement have the same axial thickness, the unlined disks of the radial inner clutch arrangement can be produced to some extent from the scrap of the unlined disks of the radial outer clutch arrangement (and vice versa). This applies to interposed disks (arranged axially between two lining-carrying disks) as well as axial end disks. The same applies to the lining-carrying elements of the lining-carrying disks and the linings of the lining-carrying disks arranged on them. The lining-carrying elements of the radial inner clutch arrangement can be produced from the scrap of the lining-carrying elements of the radial outer clutch arrangement (and vice versa) and the linings of the radial inner clutch arrangement can be produced from the scrap of the linings of the radial outer clutch arrangement (and vice versa). It is noted that the disks without linings and the lining-carrying elements are generally produced from steel and that paper linings are generally used as linings.

Figure 15:
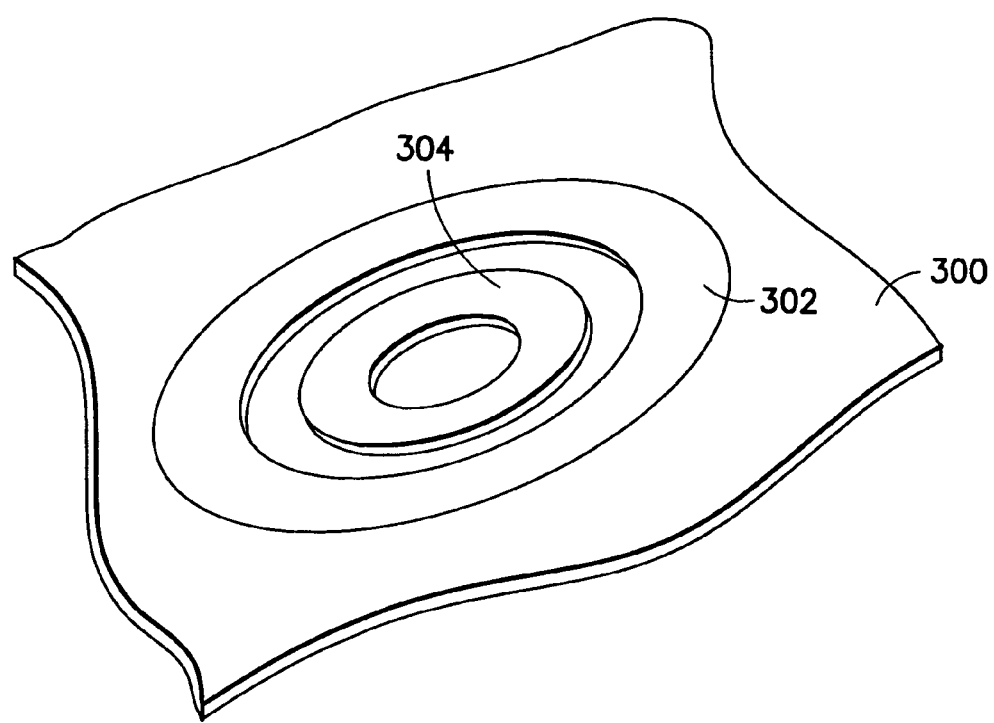
FIG. 15 is a schematic perspective view showing first and second material piece portions as cut from a common material piece.

This economy of material is indicated schematically in FIG. 15, which shows a common material piece 300 from which a first material piece portion 302 and second material piece portion 304 may be cut, wherein the first material piece portion 302 surrounds the second material piece portion 304 on the radial outside with respect to a reference point located within the material piece portions 302, 304. The first material piece portion 302 comprises one of a first unlined disk, a first lining carrying element, and a first lining, and the second material piece portion comprises a respective one of a second unlined disk, a second lining carrying element, and a second lining.

Another advantage of the embodiment of FIG. 3 is that the comparatively costly (relatively thin) end disks of the radial outer clutch arrangement 64a which according to FIG. 1 or FIG. 2 are constructed with a lining on only one axial side are dispensed with. An additional lining disk which is constructed with a lining on both sides and which is relatively thin is provided instead. Generally, the clutch of FIG. 3 can advantageously be constructed with a shorter axial length.

Another advantage of the embodiment of FIG. 3 is that the inertial mass (mass moment of inertia) of the radial outer clutch arrangement 64a acting on the output side is reduced compared with the corresponding inertial mass in the construction in FIGS. 1 and 2 because the unlined disks which have the greater inertia are now arranged on the input side. The transmission synchronization is relieved in this way. The radial outer clutch arrangement 64a can be associated with transmission gears 1, 3 and 5 and with reverse gear, for example. Conversely, the inertia of the radial outer clutch arrangement 64a on the input side is increased compared to the constructions according to FIGS. 1 and 2 due to the comparatively large inertial masses of the unlined disks. This is advantageous when a dual-mass flywheel or a torsional vibration damper along which the torque flows from the drive unit to the clutch device is arranged between the clutch device and the drive unit. In this case, the inertial mass of the radial outer clutch arrangement 64a on the input side together with the inertial mass of the radial inner clutch arrangement 72a on the input side acts as a secondary mass of the dual-mass flywheel or of the torsional vibration damper which should generally be relatively high.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A double clutch device for arrangement in a drivetrain of a motor vehicle between a drive unit and a transmission having a plurality of gears including odd gears and even gears, the clutch device comprising:
   two coaxial input shafts of the transmission, wherein one of said coaxial input shafts is associated with only the odd gears of the transmission and the other of said coaxial input shafts being associated with only the even gears of the transmission;
   an inner disk clutch arrangement and an outer disk clutch arrangement, the disk clutch arrangements being radially staggered and each being associated with a respective one said coaxial input shafts,
   each of the disk clutch arrangements comprising a set of disks, each said set of disks comprising outer disks associated with a respective outer disk carrier and inner disks associated with a respective inner disk carrier, the outer disks of each set operable to mutually engage the inner disks, one of the inner disks and outer disks of both disk clutch arrangements having linings, the other of the inner and outer disks of both disk clutch arrangements having no linings.

2. The double clutch device of claim 1, wherein the lined disks each comprise a lining-carrying element and a lining on both sides of the lining carrying element.

3. The double clutch device of claim 1, wherein the inner disks have linings.

4. The double clutch device of claim 1 wherein the unlined disks disposed in the inner and the outer disk clutch arrangements have a uniform axial thickness and are made from the same material.

5. The double clutch device of claim 2, wherein the lining-carrying elements have a uniform axial thickness and are made from the same material.

6. The double clutch device of claim 2 wherein the linings have a uniform axial thickness and are made from the same material.

7. The double clutch device of claim 1, wherein the lined disks each have a lining slot.

8. The double clutch device of claim 1, wherein the set of disks of the outer disk clutch arrangement has an inner diameter greater than the outer diameter of the set of disks of the inner disk clutch arrangement.

9. The double clutch device of claim 1 wherein the disks associated with the drive unit have an inertia greater as a whole than the disks associated with the transmission input shafts.

10. The double clutch device of claim 9, wherein the outer disks of both sets of disks are associated with the drive unit and the inner disks of both sets of disks are associated with the transmission input shafts.

11. A method of making a disk arrangement for a double clutch device, wherein the disk arrangement comprises at least one of
- first unlined disks associated with a first, radial outer disk clutch arrangement, and second unlined disks associated with a second, radial inner disk clutch arrangement;
- first lining-carrying elements associated with a first, radial outer disk clutch arrangement, and second lining-carrying elements associated with a second, radial inner disk clutch arrangement; and
- a plurality of first linings associated with a first, radial outer disk clutch arrangement, and a plurality of second linings associated with a second, radial outer disk clutch arrangement;

the method comprising the step of:
cutting from a common material piece a first material piece portion to comprise a first disk and a second material piece portion to comprise a second disk, wherein the first material piece portion to comprise the first disk surrounds the second material piece portion to comprise the second disk in the common material piece on the radial outside with respect to a reference point located inside the plural material piece portions, wherein the first and second disks comprise one of the first and second unlined disks or the first and second lining carrying elements.

12. The method making a disk arrangement of claim 11 further comprising the step of:
associating the first disks with the first, radial outer disk clutch arrangement and the second disks with the second, radial inner disk clutch arrangement.

13. The method of claim 11 wherein said disk arrangement comprises first and second unlined disks and first and second lining carrying elements, wherein the first and second unlined disks are made by said step of cutting and the first and second lining carrying elements are made by said step of cutting.

14. A double clutch for arrangement in the drive train of a motor vehicle between a drive unit and a transmission having a plurality of gears including odd gears and even gears, said arrangement comprising:

an outer input shaft of the transmission and an inner input shaft of the transmission which extends coaxially through said outer input shaft, wherein one of said input shafts is associated with only the odd gears of the transmission and the other of said input shafts being associated with only the even gears of the transmission;

an outer disk clutch arrangement comprising a plurality of outer disks which are rotationally fixed with respect to an outer disk carrier which is rotationally fixed with respect to said drive unit, and a plurality of inner disks which can be brought into driving engagement with said outer disks and which are rotationally fixed with respect to an inner disk carrier which is rotationally fixed with respect to said outer input shaft; and an inner disk clutch arrangement located radially inside of said outer disk clutch arrangement and comprising a plurality of outer disks which are rotationally fixed with respect to an outer disk carrier which is rotationally fixed with respect to said drive unit, and a plurality of inner disks which can be brought into driving engagement with said outer disks and which are rotationally fixed with respect to an inner disk carrier which is rotationally fixed with respect to said inner input shaft;

wherein one of said inner disks and said outer disks of both of said disk clutch arrangements have linings, the other of said inner and said outer disks having no linings.

15. A double clutch as in claim 14 wherein said inner disks have linings.

16. A double clutch as in claim 14 wherein said disks having linings each comprise a lining carrying element having a lining on at least one side.

17. A double clutch as in claim 16 wherein said lining carrying elements are all made of the same material and have a uniform thickness.

18. A double clutch as in claim 14 wherein the disks having no linings are all made of the same material and have a uniform thickness.

* * * * *